(12) United States Patent
Chauhan et al.

(10) Patent No.: US 10,135,954 B2
(45) Date of Patent: Nov. 20, 2018

(54) ACCESS DOCK DEVICE CONTENT ON A REMOTE CLIENT DEVICE WIRELESSLY

(71) Applicant: Intel Corporation, Santa Clara, CA (US)

(72) Inventors: Madhav Singh Chauhan, Bangalore (IN); Anees A. Sahib, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 14/977,240

(22) Filed: Dec. 21, 2015

(65) Prior Publication Data

US 2017/0180516 A1    Jun. 22, 2017

(51) Int. Cl.
| | | |
|---|---|---|
| *H04L 29/06* | (2006.01) | |
| *G06F 1/16* | (2006.01) | |
| *G06F 13/42* | (2006.01) | |
| *H04L 29/08* | (2006.01) | |

(52) U.S. Cl.
CPC ............ *H04L 69/08* (2013.01); *G06F 1/1632* (2013.01); *G06F 1/1698* (2013.01); *G06F 13/4282* (2013.01); *H04L 69/324* (2013.01)

(58) Field of Classification Search
CPC ... H04L 69/08; H04L 69/324; G06F 13/4282; G06F 1/1632; G06F 1/1698
USPC ........................................................ 709/216
See application file for complete search history.

(56) References Cited

U.S. PATENT DOCUMENTS

| | | |
|---|---|---|
| 6,725,302 B1 | 4/2004 | Benayoun et al. |
| 7,051,149 B2 | 5/2006 | Wang et al. |
| 8,914,477 B2 | 12/2014 | Gammon |
| 2007/0300004 A1 | 12/2007 | Yun |
| 2011/0205965 A1* | 8/2011 | Sprigg ................. G06F 9/4411 370/328 |
| 2011/0219163 A1* | 9/2011 | Beadnell ................ G06F 13/36 710/315 |
| 2012/0096203 A1* | 4/2012 | He ........................ G06F 13/385 710/110 |
| 2013/0268929 A1* | 10/2013 | Tyhurst ................. G06F 9/4411 718/1 |

(Continued)

FOREIGN PATENT DOCUMENTS

| | | | |
|---|---|---|---|
| WO | 2015/094166 | * | 6/2015 |
| WO | 2015/094166 A1 | | 6/2015 |

OTHER PUBLICATIONS

International Search Report and Written Opinion dated Mar. 22, 2017 from International Application No. PCT/US2016/063138, 16 pages.

(Continued)

*Primary Examiner* — Michael C Lai
(74) *Attorney, Agent, or Firm* — Schwabe, Williamson & Wyatt, P.C.

(57) ABSTRACT

Apparatuses, methods and storage medium associated with accessing dock device content on a remote client device wirelessly are disclosed herein. In embodiments, an apparatus may include one or more processors, devices, and/or circuitry to receive UoIP packets originating from a UoIP client at a wireless network interface of the dock device. The UoIP packets may be associated with an access of a local storage device coupled to a storage interface of the dock device using a non-USB protocol. The one or more processors, devices, and/or circuitry may be to translate the UoIP packets for the storage interface.

22 Claims, 7 Drawing Sheets

(56) References Cited

U.S. PATENT DOCUMENTS

2013/0315298 A1* 11/2013 Gao .................. H04N 21/4122
375/240.02
2015/0281409 A1* 10/2015 Tatiya .................. G06F 13/385
709/217

OTHER PUBLICATIONS http://www.dummies.com/how-to/content/how-to-access-usb-devices-in-windows-virtual-pc-fo.html; release date of Sep. 19, 2009; 4 pages, Microsoft; retrieved on Jan. 21, 2016.
http://www.digi.com/products/usb-and-serial-connectivity/usb-over-ip-hubs/anywhereusb; release date of Jul. 2014; 3 pages, Digi International; retrieved on Jan. 21, 2016.
http://www.eltima.com/products/usb-over-ethernet/ ; release date of Dec. 3, 2014; 11 pages, Eltima USB Network Gate; retrieved on Jan. 21, 2016.

\* cited by examiner

| Configuration descriptor | | |
|---|---|---|
| Name | Value | Hex |
| bLength | Valid | 0x09 |
| bDescriptorType | CONFIGURATION | 0x02 |
| wTotalLength | 32 bytes | 0x0020 |
| bNumInterface | 1 | 0x01 |
| bConfigurationValue | 1 | 0x01 |
| iConfiguration | 0 | 0x00 |
| bmAttributes.Reserved | Zero | 0x00 |
| bmAttributes.RemoteWakeup | Not supported | 0x0 |
| bmAttributes.SelfPowered | No, Bus Powered | 0x0 |
| bmAttributes.Reserved7 | One | 0x1 |
| bMaxPower | 500 mA | 0xFA |

| Interface descriptor | | |
|---|---|---|
| Name | Value | Hex |
| bLength | Valid | 0x09 |
| bDescriptorType | INTERFACE | 0x04 |
| bInterfaceNumber | 0 | 0x00 |
| bAlternateSetting | 0 | 0x00 |
| bNumEndpoints | 2 | 0x02 |
| bInterfaceClass | Mass Storage | 0x08 |
| bInterfaceSubClass | SCSI transparent command set | 0x06 |
| bInterfaceProtocol | Bulk-Only Transport | 0x50 |
| iInterface | 0 | 0x00 |

FIG.4B

| iInterface | 0 | 0x00 |

Endpoint descriptor

| Name | Value | Hex |
|---|---|---|
| bLength | Valid | 0x07 |
| bDescriptorType | ENDPOINT | 0x05 |
| bEndpointAddress | 1 IN | 0x81 |
| bmAttributes.TransferType | Bulk | 0x2 |
| bmAttributes.Reserved | Zero | 0x00 |
| wMaxPacketSize | 512 bytes | 0x0200 |
| bInterval | At most one NAK each 255 microframes | 0xFF |

Endpoint descriptor

| Name | Value | Hex |
|---|---|---|
| bLength | Valid | 0x07 |
| bDescriptorType | ENDPOINT | 0x05 |
| bEndpointAddress | 2 OUT | 0x02 |
| bmAttributes.TransferType | Bulk | 0x2 |
| bmAttributes.Reserved | Zero | 0x00 |
| wMaxPacketSize | 512 bytes | 0x0200 |
| bInterval | At most one NAK each 255 microframes | 0xFF |

FIG.4C

ACCESS DOCK DEVICE CONTENT ON A REMOTE CLIENT DEVICE WIRELESSLY

TECHNICAL FIELD

The present disclosure relates to the field of electronic circuits. More particularly, the present disclosure relates to accessing dock device content, e.g., smartphone content, on a remote client wirelessly.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Content on a phone may be access from a computing device, e.g., a personal computer (PC), by connecting a cable between them, or by setting up a File Transfer Protocol (FTP) server/client model. Also, using UoIP (Universal Serial Bus (USB) over Internet Protocol (IP)) provided by Intel®, one may access remote USB devices on the PC wirelessly with great convenience and ease of use.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
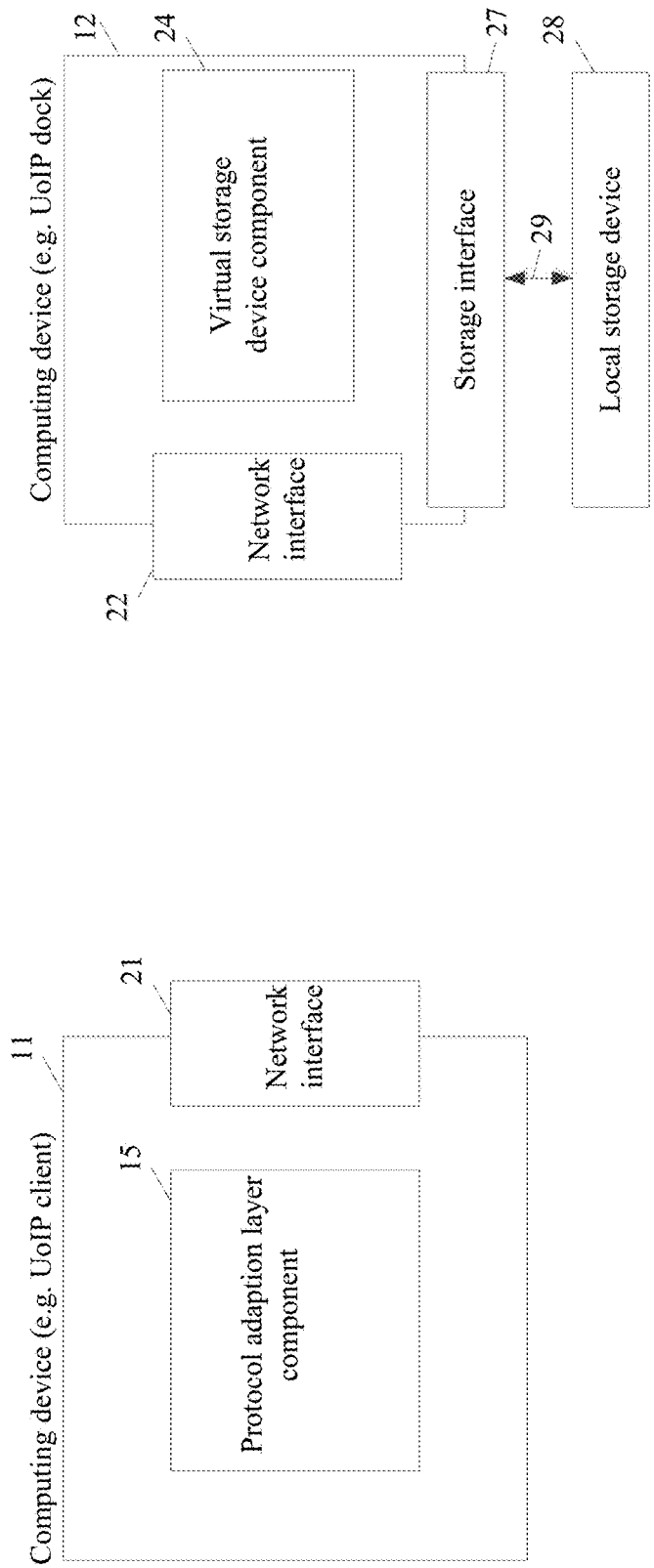
FIG. 1 illustrates a system utilizing accessing of dock device content on a remote client device wirelessly.

Apparatuses, methods and storage medium associated with accessing dock device content on a remote client device wirelessly are disclosed herein. In embodiments, an apparatus may include one or more processors, devices, and/or circuitry to receive UoIP packets originating from a UoIP client at a wireless network interface of the dock device. The UoIP packets may be associated with an access of a local storage device coupled to a storage interface of the dock device using a non-USB protocol. The one or more processors, devices, and/or circuitry may be to translate the UoIP packets for the storage interface.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

A storage device may be coupled to a non-USB interface of a UoIP dock, e.g., coupled to the embedded MultiMediaCard (eMMC) interface, a Secure Digital (SD) interface, or the like, of a mobile device, e.g., a personal portable device such as a smartphone, tablet, or the like. The storage device may be virtualized, e.g., virtualized into a USB storage class device, to appear as a USB device, such as a USB Mass Storage device, on a computing device, such as a Windows® PC, providing easy access to personal content stored on the personal portable device or other UoIP dock. The USB software stack may hence be leveraged, thereby providing a reliable and fast way to access the storage, e.g., the internal storage, of the personal portable device or other UoIP dock.

The storage device may be coupled to an internal or external interface of the UoIP dock. User data of the storage device may be captured using an operating system API and subsequently packaged as per USB Mass Storage Device (MSD) specification before sending to the UoIP client access a network, e.g., a private network to which the UoIP client and the UoIP dock are both coupled wirelessly.

UoIP based wireless access of content may be advantageous to other wireless methods such as FTP or HTTP for at least some of the reasons that follow. UoIP is based on a system level enumeration of devices, and hence facilitates use of UoIP dock content by other applications. Handling of data through UoIP may be more reliable and performance optimized. Existing applications can consume the UoIP dock's content without any changes or recompilation, thereby enabling the larger ecosystem, e.g., enabling the Internet of Things (IoT).

The Internet of Things is the network of physical objects or "things" embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure FIG. 1 illustrates a system utilizing accessing of dock device content on a remote client device wirelessly.

System 100 includes a computing device 11, e.g., a UoIP client, and a computing device 12, e.g., a UoIP dock. The computing device 12 may include a network interface 22, e.g., a wireless network interface such as a Wireless Local Area Network (WLAN) adaptor, a virtual storage device component 24, and a storage interface 27. The computing device 11 may include a network interface 21 and a protocol adaption layer component 15.

A local storage device 28 is coupled to the storage interface 27. The storage interface 27 may be an internal and/or external interface of the computing device 12. The local storage device 28 may be affixed to the computing device 12, or removably attached (an SD card is an example of a removably attached storage device), although a wireless storage interface (such as a short range wireless interface like Bluetooth) may be possible and practical. The storage interface 27 is communicatively coupled to the local storage device 28 via a non-USB protocol, e.g., communications 29 between the storage interface 27 and the local storage device 28 are according to a non-USB protocol.

The system 100 may enumerate the storage device 28 as a USB mass storage device on computing device 11. Data, e.g., user data, of the local storage device 28 may be retrieved using Operating System (OS) provided function calls prior to TCP/UDP (Transmission Control Protocol/User Datagram Protocol) network transmission to the computing device 11.

An USB device is represented by certain descriptors like a device descriptor, a configuration descriptor, an interface descriptor, an endpoint descriptor, or the like, or combinations thereof. The virtual storage device component 24 may be to create descriptors for representing the local storage device 28 (which is not actually a USB device) as a USB storage device. These descriptors may be requested by computing device 11, and the computing device 12 may provide the descriptors to the computing device 11 (in an example, the protocol adaption layer component 15 may output a control type request that is received by the virtual storage device component 24, which may generate the descriptors in response to the request). By utilizing these virtual descriptors, the computing device 11 may emulate a USB device.

It should be appreciated that in USB devices, descriptors are embedded in the USB device. In known USB, such descriptors are accessed, e.g., read. In contrast, the virtual descriptors are not embedded in local storage device 28 (which is not actually a USB device), and are created by the virtual storage device component 24. A USB descriptor may be an interface descriptor, which may indicate mass storage, keyboard, webcam, etc. A USB descriptor may be a configuration descriptor which indicates whether the device needs to connect from external power, or not. Other descriptors may indicate manufacturer, vendor ID, product ID, or the like.

The data of the local storage device 28 may be captured using an Application Program Interface (API) available on an OS of the computing device 12. In an example, the OS may be the Android® OS, and the API may include SCSI/MTD (Small Computer System Interface/Memory Technology Device) APIs. The SCSI/MTD APIs may be used to fetch the data of a particular logical or physical storage device, e.g., a particular folder or internal storage.

After the descriptors are provided to the computing device 11 and the local storage device 28 of the computing device 12 is enumerated as a USB mass storage device on the computing device 11, the protocol adaption layer component 15 may receive a request, e.g., a control type request and/or a data type request. For instance a read request (data type) may be in responsive to a user selection of what appears to the OS and/or the user to be a local USB mass storage device, e.g., a user may click on a drive in Windows. Data may be captured using an OS specific API of the computing device 12, and may be sent back to the computing device 11.

Figure 2:
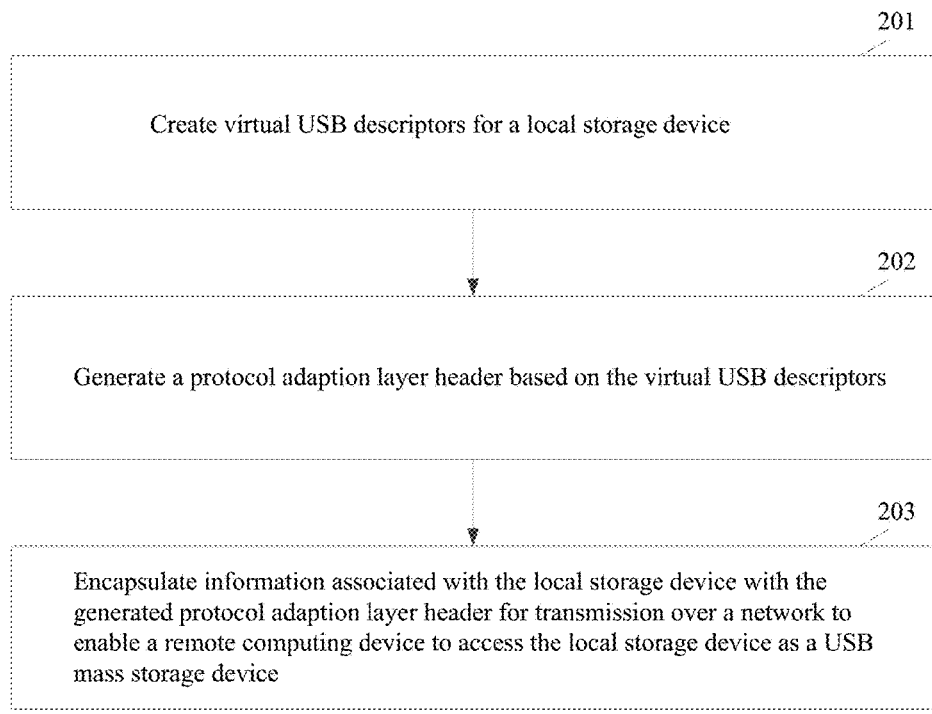
FIG. 2 illustrates operations that may performed by the virtual storage device component of the computing device of FIG. 1.

FIG. 2 illustrates operations that may performed by the virtual storage device component of the computing device of FIG. 1.

In block 201, the component 24 (which it should be appreciated may be implemented by a processing device to execute instructions stored on a computer-readable medium, or other circuitry), may create virtual USB descriptors for a local storage device.

In block 202, the component 24 may generate a protocol adaption layer header based on the virtual USB descriptors. In block 203, the component 24 may encapsulate information associated with the local storage device with the generated protocol adaption layer header for transmission over a network to enable a remote computing device to access the local storage device as a USB device, e.g., a USB mass storage device.

In an example, an electronic device may include a wireless network interface to couple to a network to receive IP packets, including UoIP packets, and a storage interface to access a local storage device using a non-USB protocol. The electronic device may include component 24, which may be to translate UoIP packets associated with an access of the local storage device made by a remote computing device via the wireless network interface, for the storage interface.

In an example, operations of the component 24 associated with translation may include creating virtual USB descriptors for the local storage device, generating a protocol adaption layer header based on the virtual USB descriptors, and encapsulating information associated with the local storage device with the generated protocol adaption layer header. The component 24 may include and/or be coupled to a network layer. A network layer may transmit the encapsulated information over the network to enable a remote computing device to access the local storage device as a USB mass storage device through said wireless network interface.

A network layer, e.g., a network layer component of the component 24 and/or coupled to the component 24, may be to generate an IP header based on information about at least one of the wireless network interface or the network, and apply the IP header to the encapsulated information prior to said transmission. The IP header may include a UoIP header.

In an example, the computing device, e.g., UoIP dock, may receive back a USB over IP message originating from the remote computing device after transmitting the encapsulated information. The component 24 may be to extract data including a protocol adaption layer header from the received USB over IP message. The component 24 may be to capture information from a local operating system specific application program interface in response to extracting the data. The component 24 may be to transmit a response to the received USB over IP message. The response may include a portion of the captured information. In an example, the response includes user data of the local storage device. In an example, the response includes an acknowledgement of a write to the local storage device.

The created virtual USB descriptors may include a USB configuration descriptor, a USB interface descriptor, and/or a USB endpoint descriptor, or the like, or combinations thereof. A In an example of USB descriptors is provided in FIGS. 4B-C.

Figure 3:
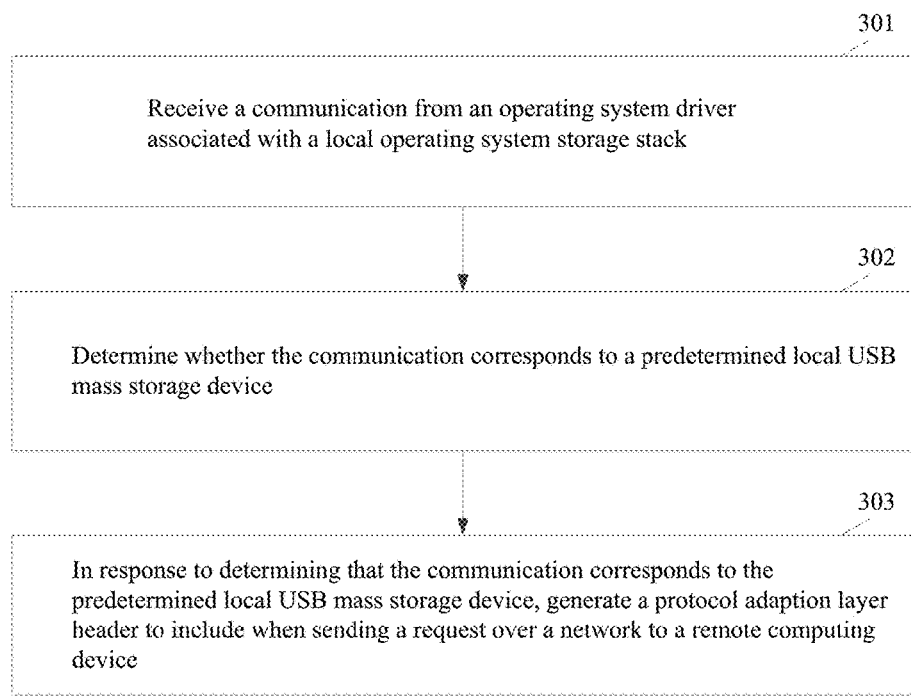
FIG. 3 illustrates operations that may be performed by the protocol adaption layer component of the computing device FIG. 1.

FIG. 3 illustrates operations that may be performed by the protocol adaption layer component of the computing device FIG. 1.

In block 301, the component 15 (which it should be appreciated may be implemented by a processing device to execute instructions stored on a computer-readable medium, or other circuitry) may receive a communication from an operating system driver associated with a local operating system storage stack.

In block 302, the component 15 may determine whether the communication corresponds to a predetermined local USB mass storage device. In block 303, in response to determining that the communication does correspond to a predetermined local USB mass storage device, the component 15 may generate a protocol adaption layer header to include when sending a request over a network to a remote computing device (e.g., a UoIP dock).

In an example, an electronic device may include a network interface to couple to a network, and a component 15, which may include a UoIP client core stack (kernel mode drivers). The UoIP client core stack may include a UoIP hub (which may include a virtual client hub and a USB protocol adaptation layer client) and a network layer. In an example, the UoIP hub may be to receive a communication from an operating system driver associated with a local operating system storage stack associated with non-USB storage. The UoIP hub may be to, in response to the receipt, send a request over the network to a remote mobile device, wherein the request includes information corresponding to the communication.

In an example, the UoIP hub may be to determine whether the communication corresponds to a predetermined local USB mass storage device. In response to determining that the communication corresponds to the predetermined local USB mass storage device, the UoIP hub may be to generate a protocol adaption layer header, and encapsulate in the generated protocol adaption layer header.

In an example, the UoIP hub may be to receive encapsulated information over the network. The encapsulated information to enable the operating system to access a storage device of the mobile device as a USB mass storage device through said wireless network interface.

In an example, the predetermined local USB mass storage device may include a virtual storage device connected to the mobile device via a non-USB input/output interface of the mobile device.

In an example, the encapsulated information may include USB descriptors created by the mobile device. In an example, the USB descriptors may include a USB configuration descriptor, a USB interface descriptor, and/or a USB endpoint descriptor, or the like, or combinations thereof.

In an example, the component 15 may be to recognize a UoIP message of an incoming message received on the network interface, decapsulate data of the incoming message, and deliver read data from the incoming message to the operating system driver as a response to the communication from an operating system driver.

Figure 4:
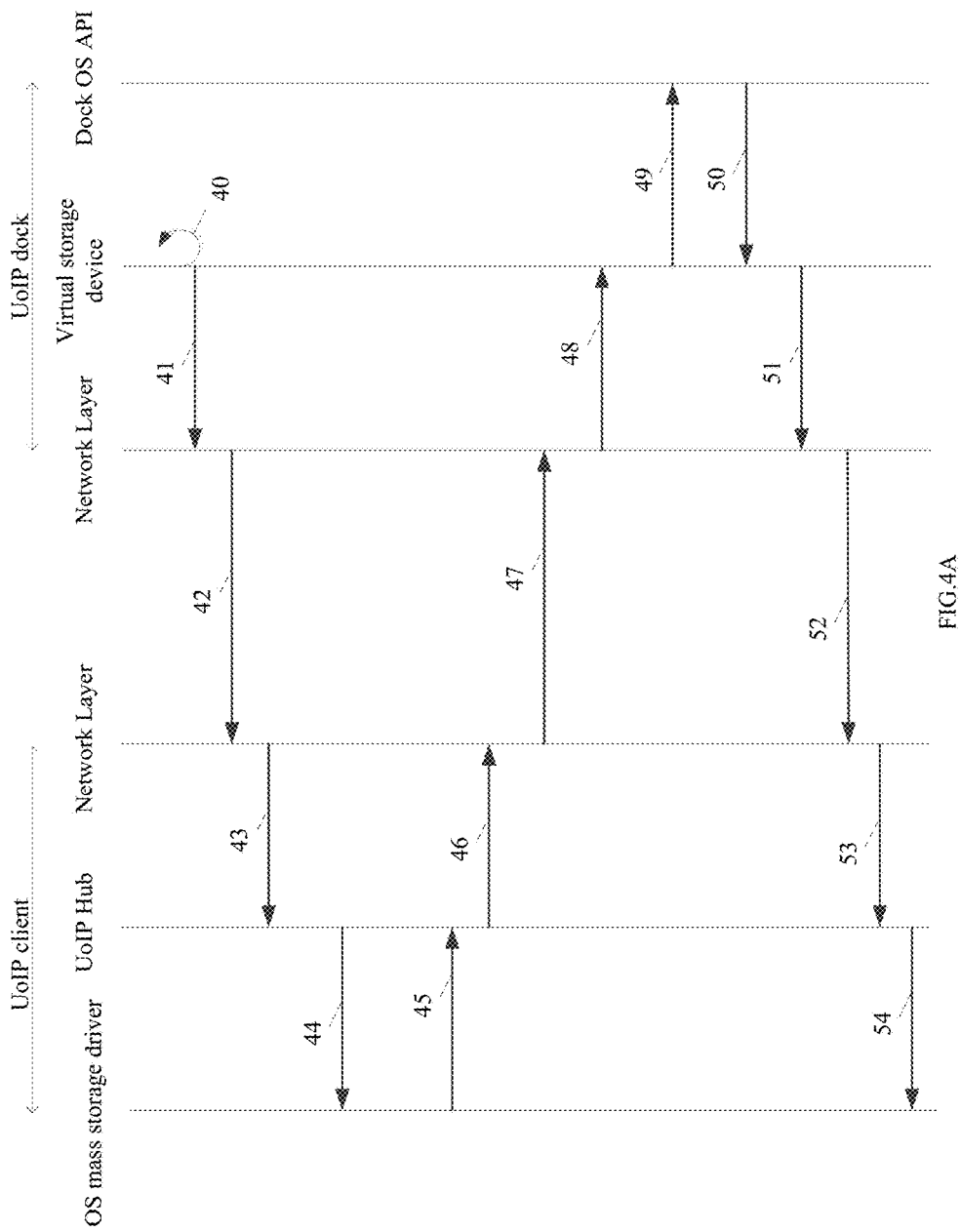
FIG. 4A illustrates a signaling diagram of another example system associated with accessing dock device content on a remote client device wirelessly.
FIGS. 4B-C illustrate examples of virtual USB descriptors that may be created by the UoIP dock of FIG. 4A.

FIG. 4A illustrates a signaling diagram of another example system associated with accessing dock device content on a remote client device wirelessly. The virtual storage device of the UoIP dock may generate virtual USB descriptors (indicated by arrow 40). An example of USB descriptors is provided in FIGS. 4B-C.

Referring again to FIG. 4A, the generation of the virtual USB descriptors may be in response to a control type request (not shown) originating from the UoIP hub (and the control type request may be generated by the UoIP hub in response to a request by an OS driver, e.g., an OS mass storage driver).

The OS request may be responsive to a user request (not shown). In an example, the UoIP client may include a discovery client, e.g., a lightweight peripheral discovery client, in communication with a discovery server, e.g., a lightweight peripheral discovery server, of the UoIP dock. A discovery protocol may enable the discovery client to identify, e.g., discover, the storage device of the UoIP dock. The discovery client and/or the discovery server may cause a graphical user interface to be displayed on a display of one or both of the UoIP client and the UoIP dock. The graphical user interface may provide a notification to a user about the identified storage device, giving the user options such as an option to use the storage device on the UoIP client as a USB device, e.g., a USB mass storage device. The user request (may be associated with user mode) that triggers the OS request (may be associated with kernel mode) may be in response to a user selection from the provided option(s).

The virtual storage device may send signal 41 including the created virtual USB descriptors. The corresponding network layer may send signal 42, which includes UoIP packets.

The network layer of the UoIP client may send signal 43 after decapsulating the UoIP packets. The UoIP hub may decapsulate the protocol adaptation layer header and send signal 44. The operating system may enumerate the storage device as a USB device, e.g., a USB mass storage device. Enumeration may include associating a unique identifier with the storage device.

After enumeration, the UoIP hub may receive a signal 45 from the OS mass storage device driver. The UoIP hub may determine from a unique identifier of the signal 45 whether the signal corresponds to the storage device, and may determine whether the signal 45 represents a control type or data type request (and in the latter case whether the signal 45 represents a read or write request). The UoIP hub may generate a protocol adaptation layer header based on these determinations, perform encapsulation, and send signal 46. The corresponding network layer may send signal 47.

The network layer of the UoIP dock may receive the signal 47, and generate signal 48 after striping the UoIP header. The virtual storage device may perform operations according to the protocol adaption layer header, and send signal 49 to the dock OS API.

The virtual storage device may receive signal 50 back from the dock OS API. In an example, the signal 50 includes data (e.g., user data) of the storage device corresponding to a read data type request. The virtual storage device performs protocol adaption layer encapsulation, sends signal 51 to the corresponding network layer.

The network layer of the UoIP client receives signal 52, and sends signal 53 similar to the sending of signal 43. The UoIP hub performs protocol adaption layer decapsulation, and sends signal 54, similar to the sending of signaling 44, to provide the user data of the storage device to the OS driver.

Figure 5:
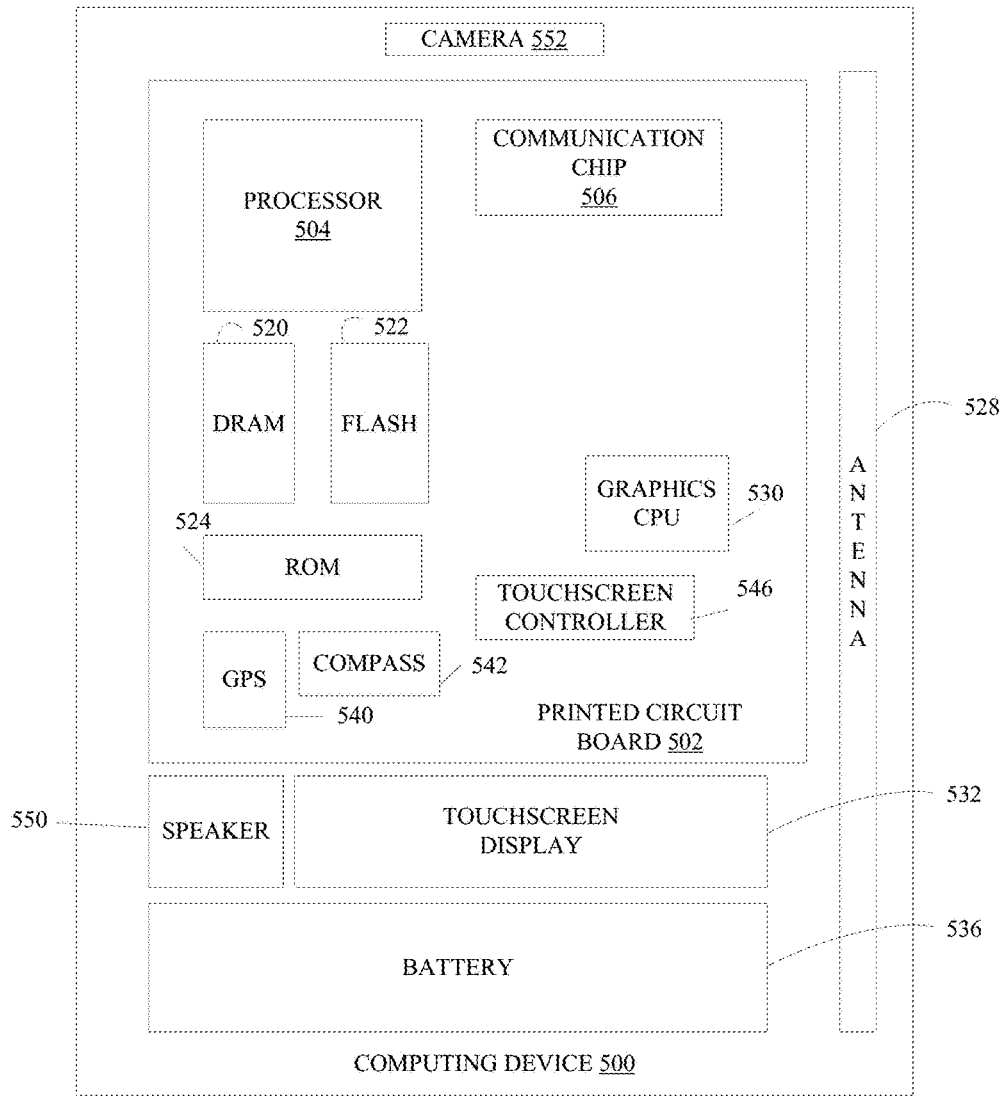
FIG. 5 illustrates an example computing device that may employ the apparatuses and/or methods described herein.

FIG. 5 illustrates an example computing device that may employ the apparatuses and/or methods described herein.

Example computing device 500 may employ the apparatuses and/or methods described herein, in accordance with various embodiments. As shown, computing device 500 may include a number of components, such as one or more processor(s) 504 (one shown) and at least one communication chip 506.

In various embodiments, the one or more processor(s) 504 each may include one or more processor cores. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, a memory controller (not shown), volatile memory (e.g., dynamic random access memory (DRAM) 520), non-volatile memory such as read only memory (ROM) 524, flash memory 522, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or a storage device (not shown) may include associated firmware (not shown) storing programming instructions configured to enable computing device 500, in response to execution of the programming instructions by one or more processor(s) 504, to practice all or selected aspects of the methods described herein. In various embodiments, these aspects may additionally or alternatively be implemented using hardware separate from the one or more processor(s) 504, flash memory 512, or storage device 511.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

In an example, an apparatus to enable a remote to enumerate a remote storage as a local USB Universal Serial Bus (USB) device. The apparatus may include a wireless network interface to couple to a network to receive Internet Protocol (IP) packets, including UoIP (USB over IP) packet. The apparatus may include a storage interface configured to access a local storage device using a non-USB protocol. The apparatus may include a protocol adaption layer component configured to translate UoIP packets associated with an access of the local storage device made by a remote computing device via the wireless network interface, for the storage interface.

In an example, the protocol adaption layer component may be configured to create virtual USB descriptors for the local storage device. The protocol adaption layer component may be configured to generate a protocol adaption layer header based on the virtual USB descriptors. The protocol adaption layer component may be configured to encapsulate information associated with the local storage device with the generated protocol adaption layer header. The protocol adaption layer component may be configured to transmit the encapsulated information over the network to enable a remote computing device to access the local storage device as a USB mass storage device through said wireless network interface.

The protocol adaption layer component may be configured to a network layer component coupled to the protocol adaption layer component. The network layer component may be configured to generate an IP header based on information about at least one of the wireless network interface or the network. The network layer component may be configured to apply the IP header to the encapsulated information prior to said transmission.

In an example, the IP header may include a USB over IP header.

In an example, the protocol adaption layer may be configured to receive back a USB over IP message originating from the remote computing device after the transmission of the encapsulated information. The protocol adaption layer may be configured to extract data including a protocol adaption layer header from the received USB over IP message. The protocol adaption layer may be configured to capture information from a local operating system specific application program interface in response to the extraction of the data. The protocol adaption layer may be configured to transmit a response to the received USB over IP message, the response including a portion of the captured information. In an example, the response may include at least one of user data of the local storage device or an acknowledgement of a write to the local storage device.

In an example, the created virtual USB descriptors include a USB configuration descriptor, a USB interface descriptor, and a USB endpoint descriptor.

In an example, an apparatus to enumerate a remote storage as a local USB Universal Serial Bus (USB) device may be provided. The apparatus may include a network interface to couple to a network; and a Universal Serial Bus over Internet Protocol (UoIP) hub coupled to the network interface. The UoIP hub may be configured to receive a communication from an operating system driver associated with a local operating system storage stack associated with a non-USB storage. The apparatus may be configured to send a request over the network to a remote mobile device, wherein the request includes information corresponding to the communication in response to the receipt.

The UoIP hub may be configured to determine whether the communication corresponds to a predetermined local USB mass storage device. The UoIP hub may be configured to generate a protocol adaption layer header in response to a determination that the communication corresponds to the predetermined local USB mass storage device. The UoIP hub may be configured to encapsulate in the generated protocol adaption layer header.

In an example, the UoIP hub may be configured to receive encapsulated information over the network, the encapsulated information to enable the operating system to access a storage device of the mobile device as a USB mass storage device through said wireless network interface.

In an example, the predetermined local USB mass storage device includes a virtual storage device connected to the mobile device via a non-USB input/output interface of the mobile device.

In an example, the encapsulated information includes USB descriptors created by the mobile device.

In an example, the USB descriptors include a USB configuration descriptor, a USB interface descriptor, and a USB endpoint descriptor.

In an example, the UoIP hub may be configured to recognize a UoIP message of an incoming message received on the network interface. In an example, the UoIP hub may be configured to decapsulate data of the incoming message and deliver read data from the incoming message to the operating system driver as a response to the communication from an operating system driver.

In an example, a computer-readable medium may be provided to enable a remote to enumerate a remote storage as a local USB Universal Serial Bus (USB) device. The computer-readable medium may have instructions stored thereon that, in response to execution by a processing device, cause the processing device to perform operations, to create virtual USB descriptors for a local storage device that corresponds to a non-USB protocol; generate a protocol adaption layer header based on the virtual USB descriptors; encapsulate information associated with the local storage device with the generated protocol adaption layer header; and transmit the encapsulated information over a network using a local wireless network interface to enable a remote computing device to access the local storage device as a USB mass storage device through said local wireless network interface.

In an example, the operations are further to generate an Internet Protocol (IP) header based on information about at least one of the wireless network interface or the network; and apply the IP header to the encapsulated information prior to said transmission.

In an example, the IP header includes a USB over IP header.

In an example, the operations are further to receive back a USB over IP message originating from the remote computing device after transmitting the encapsulated information; extract data including a protocol adaption layer header from the received USB over IP message; capture information from a local operating system specific application program interface in response to the extraction of the data; and transmit a response to the received USB over IP message, the response including a portion of the captured information.

In an example, the response includes at least one of user data of the local storage device or an acknowledgement of a write to the local storage device. In an example, the created virtual USB descriptors include a USB configuration descriptor, a USB interface descriptor, and a USB endpoint descriptor.

In an example, a computer-readable medium to enumerate a remote storage as a local USB Universal Serial Bus (USB) device is provided. The computer-readable medium may have instructions stored thereon that, in response to execution by a processing device, cause the processing device to perform operations, to receive a communication from an operating system driver associated with a local operating system storage stack; determine whether the communication corresponds to a predetermined local USB mass storage device; to generate a protocol adaption layer header in response to a determination that the communication corresponds to the predetermined local USB mass storage device; and to send a request over a network to a remote mobile device, the request including information corresponding to the communication encapsulated in the generated protocol adaption layer header.

In an example, the predetermined local USB mass storage device includes a virtual storage device connected to the mobile device via a non-USB input/output interface of the mobile device.

In an example, the encapsulated information includes USB descriptors created by the mobile device.

In an example, the USB descriptors include a USB configuration descriptor, a USB interface descriptor, and a USB endpoint descriptor.

In an example, the operations are further to recognize a USB over Internet Protocol (IP) message of an incoming message received on the network interface; and decapsulate data of the incoming message and deliver read data from the incoming message to the operating system driver as a response to the communication from an operating system driver.

In an example, an electronic device to enable a remote to enumerate a remote storage as a local USB Universal Serial Bus (USB) device is provided. The electronic device may include means for creating virtual USB descriptors for a local storage device that corresponds to a non-USB protocol; means for generating a protocol adaption layer header based on the virtual USB descriptors; means for encapsulating information associated with the local storage device with the generated protocol adaption layer header; and means for transmitting the encapsulated information over a network using a local wireless network interface to enable a remote computing device to access the local storage device as a USB mass storage device through said local wireless network interface.

In an example, the electronic device may include means for generating an Internet Protocol (IP) header based on information about at least one of the wireless network interface or the network; and means for applying the IP header to the encapsulated information prior to said transmission.

In an example, the IP header includes a USB over IP header.

In an example, the electronic device includes means for receiving back a USB over IP message originating from the remote computing device after transmitting the encapsulated information; means for extracting data including a protocol adaption layer header from the received USB over IP message; means for capturing information from a local operating system specific application program interface in response to the extraction of the data; and means for transmitting a response to the received USB over IP message, the response including a portion of the captured information.

In an example, the response includes at least one of user data of the local storage device or an acknowledgement of a write to the local storage device.\

In an example, the created virtual USB descriptors include a USB configuration descriptor, a USB interface descriptor, and a USB endpoint descriptor.

In an example, an electronic device to enumerate a remote storage as a local USB Universal Serial Bus (USB) device is provided. The electronic device may include means for receive a communication from an operating system driver associated with a local operating system storage stack; means for determine whether the communication corresponds to a predetermined local USB mass storage device; means for generate a protocol adaption layer header in response to a determination that the communication corresponds to the predetermined local USB mass storage device; and means for sending a request over a network to a remote mobile device, the request including information corresponding to the communication encapsulated in the generated protocol adaption layer header.

In an example, the predetermined local USB mass storage device includes a virtual storage device connected to the mobile device via a non-USB input/output interface of the mobile device.

In an example, the encapsulated information includes USB descriptors created by the mobile device.

In an example, the USB descriptors include a USB configuration descriptor, a USB interface descriptor, and a USB endpoint descriptor.

In an example, the electronic device may include means for recognizing a USB over Internet Protocol (IP) message of an incoming message received on the network interface; and means for decapsulating data of the incoming message and deliver read data from the incoming message to the operating system driver as a response to the communication from an operating system driver.

In an example, a method to enable a remote to enumerate a remote storage as a local USB Universal Serial Bus (USB) device is provided. The method may include creating virtual USB descriptors for a local storage device that corresponds to a non-USB protocol; generating a protocol adaption layer header based on the virtual USB descriptors; encapsulating information associated with the local storage device with the generated protocol adaption layer header; and transmitting the encapsulated information over a network using a local wireless network interface to enable a remote computing device to access the local storage device as a USB mass storage device through said local wireless network interface.

In an example, the method includes generating an Internet Protocol (IP) header based on information about at least one of the wireless network interface or the network; and applying the IP header to the encapsulated information prior to said transmission.

In an example, the IP header includes a USB over IP header.

In an example, the method includes receiving back a USB over IP message originating from the remote computing device after transmitting the encapsulated information; extracting data including a protocol adaption layer header from the received USB over IP message; capturing information from a local operating system specific application program interface in response to the extraction of the data; and transmitting a response to the received USB over IP message, the response including a portion of the captured information.

In an example, the response includes at least one of user data of the local storage device or an acknowledgement of a write to the local storage device. In an example, the created virtual USB descriptors include a USB configuration descriptor, a USB interface descriptor, and a USB endpoint descriptor.

In an example, a method to enumerate a remote storage as a local USB Universal Serial Bus (USB) device is provided. The example may include receiving a communication from an operating system driver associated with a local operating system storage stack; determining whether the communication corresponds to a predetermined local USB mass storage device; in response to a determination that the communication corresponds to the predetermined local USB mass storage device, generating a protocol adaption layer header; and sending a request over a network to a remote mobile device, the request including information corresponding to the communication encapsulated in the generated protocol adaption layer header.

In an example, the predetermined local USB mass storage device includes a virtual storage device connected to the mobile device via a non-USB input/output interface of the mobile device.

In an example, the encapsulated information includes USB descriptors created by the mobile device.

In an example, the USB descriptors include a USB configuration descriptor, a USB interface descriptor, and a USB endpoint descriptor.

In an example, the method includes recognizing a USB over Internet Protocol (IP) message of an incoming message received on the network interface; and decapsulating data of the incoming message and deliver read data from the incoming message to the operating system driver as a response to the communication from an operating system driver.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
a wireless network interface to receive Internet Protocol (IP) packets over a network connection, the IP packets including Universal serial bus over IP (UoIP) packets; and
a storage interface to access a local storage device using a non-USB protocol; and
a protocol adaption layer component to translate the UoIP packets associated with an access of the local storage device made by a remote computing device via the wireless network interface, for the storage interface, wherein to translate the UoIP packets, the protocol adaption layer is to:
create virtual Universal Serial Bus (USB) descriptors for the local storage device;
generate a protocol adaption layer header based on the virtual USB descriptors;
encapsulate the generated protocol adaption layer header with information associated with the local storage device to obtain encapsulated information; and
cause the wireless network interface to transmit the encapsulated information over the network to the remote computing device, the encapsulated information to enable the remote computing device to access the local storage device as a USB mass storage device through said wireless network interface.

2. The apparatus of claim 1, further comprising:
a network layer component coupled to the protocol adaption layer component, the network layer component to:
generate an IP header based on information about at least one of the wireless network interface or the network; and
apply the IP header to the encapsulated information prior to said transmission.

3. The apparatus of claim 2, wherein the IP header includes a USB over IP header.

4. The apparatus of claim 1, the protocol adaption layer to:
receive back a USB over IP message originating from the remote computing device after transmitting the encapsulated information;
extract data including a protocol adaption layer header from the received USB over IP message;
capture information from a local operating system specific application program interface in response to extracting the data; and
transmit a response to the received USB over IP message, the response including a portion of the captured information.

5. The apparatus of claim 4, wherein the response includes user data of the local storage device.

6. The apparatus of claim 4, wherein the response includes an acknowledgement of a write to the local storage device.

7. The apparatus of claim 1, wherein the created virtual USB descriptors include a USB configuration descriptor, a USB interface descriptor, and a USB endpoint descriptor.

8. An apparatus, comprising:
a network interface to:
send a request over a network to a remote mobile device, and
receive, in response to the request, encapsulated information over the network, wherein the encapsulated information is to enable a local operating system to access a storage device of the remote mobile device as a USB mass storage device through the network interface; and
a Universal Serial Bus over Internet Protocol (UoIP) hub coupled to the network interface, the UoIP hub to:
receive a communication from an operating system driver associated with a local operating system storage stack associated with a non-USB storage;
determine whether the communication corresponds to a predetermined local USB mass storage device;

generate a protocol adaption layer header in response to determining that the communication corresponds to the predetermined local USB mass storage device;

encapsulate information associated with the local USB mass storage device in the generated protocol adaption layer header; and generate the request to include the generated protocol adaption layer header.

9. The apparatus of claim 8, wherein the predetermined local USB mass storage device includes a virtual storage device connected to the mobile device via a non-USB input/output interface of the mobile device.

10. The apparatus of claim 8, wherein the encapsulated information includes USB descriptors created by the mobile device.

11. The apparatus of claim 10, wherein the USB descriptors include a USB configuration descriptor, a USB interface descriptor, and a USB endpoint descriptor.

12. The apparatus of claim 8, the UoIP hub to:

recognize a UoIP message of an incoming message received on the network interface; and decapsulate data of the incoming message to obtain USB descriptors, and deliver the USB descriptors from the incoming message to the operating system driver as a response to the communication from an operating system driver, wherein the USB descriptors are for enumeration of a storage device as a USB device.

13. A non-transitory computer-readable medium (NT-CRM) having instructions stored thereon, wherein execution of the instructions by a processing device is to cause the processing device to:

create virtual Universal Serial Bus (USB) descriptors for a non-USB local storage device, wherein the non-USB local storage device is a storage device that is to operate according to a protocol other than a USB protocol;

generate a protocol adaption layer header based on the virtual USB descriptors;

encapsulate information associated with the non-USB local storage device with the generated protocol adaption layer header; and control transmission of the encapsulated information over a network using a local wireless network interface to enable a remote computing device to access the non-USB local storage device as a USB mass storage device through said local wireless network interface.

14. The NTCRM of claim 13, wherein execution of the instructions is to cause the processing device to:

generate an Internet Protocol (IP) header based on information about at least one of the local wireless network interface or the network; and apply the IP header to the encapsulated information prior to said transmission.

15. The NTCRM of claim 14, wherein the IP header includes a USB over IP header.

16. The NTCRM of claim 13, wherein execution of the instructions is to cause the processing device to:

control receipt back of a USB over IP message originating from the remote computing device after transmitting the encapsulated information;

extract data including a protocol adaption layer header from the received USB over IP message;

capture information from a local operating system specific application program interface in response to the extraction of the data; and control transmission of a response to the received USB over IP message, the response including a portion of the captured information.

17. The NTCRM of claim 16, wherein the response includes at least one of user data of the non-USB local storage device or an acknowledgement of a write to the non-USB local storage device.

18. The NTCRM of claim 13, wherein the created virtual USB descriptors include a USB configuration descriptor, a USB interface descriptor, and a USB endpoint descriptor.

19. A method, comprising:

creating virtual Universal Serial Bus (USB) descriptors for a non-USB local storage device, wherein the non-USB local storage device is a storage device that is to operate according to a protocol other than a USB protocol;

generating a protocol adaption layer header based on the virtual USB descriptors;

encapsulating information associated with the non-USB local storage device with the generated protocol adaption layer header; and transmitting the encapsulated information over a network using a local wireless network interface to enable a remote computing device to access the non-USB local storage device as a USB mass storage device through said local wireless network interface.

20. The method of claim 19, further comprising:

generating an Internet Protocol (IP) header based on information about at least one of the wireless network interface or the network; and applying the IP header to the encapsulated information prior to said transmission.

21. The method of claim 20, wherein the IP header includes a USB over IP header.

22. The method of claim 19, further comprising:

receiving back a USB over IP message originating from the remote computing device after transmitting the encapsulated information;

extracting data including a protocol adaption layer header from the received USB over IP message;

capturing information from a local operating system specific application program interface in response to the extraction of the data; and transmitting a response to the received USB over IP message, the response including a portion of the captured information.

* * * * *